UNITED STATES PATENT OFFICE 2,540,855

FORMIC ACID SOLUTIONS OF SYNTHETIC LINEAR POLYAMIDES FROM ALPHA-AMINO ACIDS

Charles William Tullock, Wilmington, Del., assignor to E. I. du Pont de Nemours & Company, Wilmington, Del., a corporation of Delaware No Drawing. Application February 2, 1949, Serial No. 74,243

6 Claims. (Cl. 260—31.2)

This invention relates to synthetic linear polyamides of alpha-amino acids, and more particularly to new and useful fluid compositions of these polyamides.

Formic acid has been described as a solvent for polyamides which have a plurality of carbons separating the amide groups, e. g. polyhexamethylene adipamide. However, as a class, alpha-amino acid polyamides are insoluble in formic acid. Thus, the polymers from glycine, DL-leucine, 2 - amino-4,6,6-trimethylheptanoic acid are insoluble in formic acid at temperatures of up to 100° C. as are also the polyamides from alpha-amino-isobutyric acid, DL-norleucine and L-leucine.

This invention has as an object the preparation of formic acid solutions of alpha-amino acid polyamides. Other objects will appear hereinafter.

These objects are accomplished by the invention of solutions, in formic acid, of alpha-amino acid polyamides having at least 20%, on the weight basis, of units of the formula

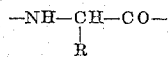

wherein R is methyl, ethyl, isopropyl, or secondary butyl, i. e., of alpha-amino acid polyamides in whose composition from 20 to 100%, by weight, consists of residues (Vickery, Science 108 568, November 19, 1948) of alanine, alpha-amino-n-butyric acid, valine, and/or isoleucine. Copolymers of these amino acids with other alpha-amino acids which are soluble in formic acid must contain at least 20% on a weight basis of the above specified amino acids. The preferred copolyamides are those of the four amino acids represented by the above formula in view of the fact that these copolyamides are soluble in formic acid irrespective of the specific amino acid content. Formic acid solutions of these polyamides are particularly useful for the preparation of films and fibers from the polymers.

The following examples in which parts are by weight are illustrative of the invention.

EXAMPLE I

A total of 19.7 parts of DL-alanine homopolymer was dissolved at room temperature (about 30° C.) in 80.3 parts of 98–100% formic acid. The resulting solution was very fluid and upon evaporation of the formic acid from a solution which had been poured on the glass plate gave a clear strong self-supporting film.

EXAMPLE II

A total of 9.3 parts of DL-alpha-amino-n-butyric acid homopolymer was dissolved in 90.7 parts of 98–100% formic acid at 50° C. to give a clear flowable solution from which films could be cast as described in Example I.

A formic acid solution containing about 12% of the polymer was obtained upon heating the solvent and polymer at 100° C. in these amounts.

EXAMPLE III

A total of 4.9 parts of DL-valine homopolymer was dissolved in 95.1 parts of formic acid at 50° C to give a solution which could be flowed in a glass plate. Films were obtained upon evaporation of the solvent.

EXAMPLE IV

A fluid solution was obtained upon dissolving 2 parts of the homopolymer of DL-isoleucine in 98 parts of 98–100% formic acid. Clear films were obtained up the evaporation of the formic acid from a solution flowed on a glass plate.

The solubility of synthetic alpha-amino acid polymers in formic acid is readily determined by placing approximately 1% of the polymer (by weight) in formic acid (98–100%). Generally, those polymers that are soluble in formic acid dissolve at room temperature although the application of heat to the formic acid hastens solution. Many of the polyamides and copolyamides are soluble in formic acid to an extent of 8% or more by weight.

The following table lists synthetic alpha-amino acid homopolymers which have been found to be soluble in formic acid to the extent of at least 2%.

*Table I.—Soluble homopolymers*

DL-alanine ($CH_3CHNH_2COOH$)
DL-alpha-amino-n-butyric acid ($CH_3CH_2CHNH_2COOH$)

DL-valine (($CH_3$)$_2CHCHNH_2COOH$)
DL-isoleucine ($CH_3CH_2CHCH_3CHNH_2COOH$)

In Table II below are listed illustrative copolymers soluble in formic acid to the extent of at least 2%. In this table the ratios are the ratio in parts by weight of the N-carboanhydride employed in the manufacture of the copolymer from the corresponding N-carboanhydrides.

Table II.—Soluble copolymers

| Copolymer | Ratios |
|---|---|
| DL-alanine/DL-alpha-amino-n-butyric acid | 1/1, 1/3, 3/1 |
| DL-alanine/alpha-aminoisobutyric acid | 3/1 |
| DL-alanine/DL-norvaline | 1/1, 3/1 |
| DL-alanine/DL-valine | 1/1, 1/3, 3/1 |
| DL-alanine/DL-leucine ((CH$_3$)$_2$CHCH$_2$CHNH$_2$COOH) | 1/1, 1/3, 3/1 |
| DL-alanine/DL-isoleucine ((CH$_3$)(C$_2$H$_5$)CHCHNH$_2$COOH) | 1/1, 1/3, 3/1 |
| DL-alanine/DL-phenylalanine (C$_6$H$_5$CH$_2$CHNH$_2$COOH) | 1/1 |
| DL-norvaline/DL-alpha-amino-n-butyric acid | 1/1, 1/3 |
| DL-valine/alpha-aminoisobutyric acid | 1/3, 3/1 |
| DL-norleucine (alpha-aminocaproic)/DL-alpha-amino-n-butyric acid | 1/3 |
| DL-leucine/DL-alpha-amino-n-butyric acid | 1/3, 3/1 |
| DL-isoleucine/DL-alpha-amino-n-butyric acid | 1/1, 1/3, 3/1 |
| DL-isoleucine/alpha-aminoisobutyric acid | 3/1 |
| DL-norvaline/DL-valine | 1/1, 1/3 |
| DL-norvaline/DL-isoleucine | 1/3 |
| DL-valine/DL-norleucine | 1/1, 3/1 |
| DL-valine/DL-leucine | 3/1 |
| DL-valine/DL-isoleucine | 1/1, 1/3, 3/1 |
| DL-norleucine/DL-isoleucine | 1/3 |
| DL-valine/DL-alpha-amino-n-butyric acid | 1/3, 1:1, 3:1 |

In contrast to the soluble homopolymers and copolymers illustrated in Tables I and II, the following homopolymers are insoluble in formic acid, i. e., dissolve to the extent of less than 0.5%.

Table III.—Insoluble homopolymers alpha-Aminoisobutyric acid
L-leucine
DL-leucine
DL-norleucine
2-amino-4,6,6-trimethylheptanoic acid
DL-phenylalanine
alpha-Aminodiethylacetic acid
1-aminocyclohexanecarboxylic acid
DL-alpha-Amino-alpha-methylbutyric acid
DL-alpha-Aminolauric acid
DL-norvaline (polymer prepared in benzene at 65° C.)
Glycine Thus synthetic homopolymers and copolymers of alpha-amino acids of the structural formula RCHNH$_2$COOH wherein R is methyl, ethyl, isopropyl or secondary-butyl radicals are soluble in formic acid, whereas homopolymers of amino acids not representable by such formula are insoluble in formic acid and their copolymers are likewise insoluble in formic acid unless they contain at last twenty per cent, by weight, of units —NH—CHR—CO wherein R is as above.

Alpha-amino acid copolyamides containing at least 20% combined units derived from acids of the above structural formula are soluble in formic acid. The preferred formic acid soluble polymers and copolymers are those which have at last 50 alpha-amino acid units, i. e., have a degree of polymerization, D. P., of at least 50.

To dissolve the amino acid, the formic acid solvent should contain at least 90% formic acid. Substantially pure formic acid (98–100% formic acid) dissolves the amino acid polymers more rapidly and is therefore preferred.

Solutions which are particularly useful are those containing from 1–25% of the polyamide based on the weight of formic acid. Solutions of polyalanine in formic acid containing even more than 25% polyalanine can be prepared and are particularly useful. These solutions are useful for the casting of films or fibers of the synthetic alpha-amino acid polymers. Modification of the properties of the polyamide may be effected in the formic acid solution.

In addition to modifying agents that may be employed, plasticizers, fillers, etc. may be present in the formic acid solution of the polyamide.

The polyamides, the solubility of which forms the subject matter of the present invention, being made from DL amino acids, are optically inactive.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A solution in formic acid of an optically inactive condensation polymer wherein the polymer chain consists of alpha-primary monoamino-monocarboxylic acid units of which at least 20% are of the formula —NH—CHR—CO—wherein R is selected from the group consisting of methyl, ethyl, isopropyl, and secondary butyl radicals.

2. A solution as in claim 1 wherein the polymer contains at least 50 amino acid units.

3. A solution in formic acid of an optically inactive condensation polymer wherein the polymer chain consists of alpha-primary monoamino-monocarboxylic acid units of which at least 20% are alanine units and the polymer contains at least 50 amino acid units.

4. A solution in formic acid of an optically inactive condensation polymer wherein the polymer chain consists of alpha-primary monoamino-monocarboxylic acid units of which at least 20% are alpha-amino-n-butyric acid units and the polymer contains at least 50 amino acid units.

5. A solution in formic acid of an optically inactive condensation polymer wherein the polymer chain consists of alpha-primary monoamino-monocarboxylic acid units of which at least 20% are valine units and the polymer contains at least 50 amino acid units.

6. A solution in formic acid of an optically inactive condensation polymer wherein the polymer chain consists of alpha-primary monoamino-monocarboxylic acid units of which at least 20% are isoleucine units and the polymer contains at least 50 amino acid units.

CHARLES WILLIAM TULLOCK.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,293,761 | Peters | Aug. 25, 1942 |

OTHER REFERENCES

Pages 791–795, Journal Organic Chemistry, Nov. 1948.